(12) United States Patent
Park et al.

(10) Patent No.: US 9,347,772 B2
(45) Date of Patent: May 24, 2016

(54) APPARATUS FOR MEASUREMENT OF THREE-DIMENSIONAL SHAPE

(71) Applicant: SAMSUNG ELECTRONICS CO., LTD., Suwon-si, Gyeonggi-do (KR)

(72) Inventors: Dae Seo Park, Suwon-si (KR); Dae Gwan Kim, Yongin-si (KR); Won Soo Ji, Hwaseong-si (KR); Choo Ho Kim, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 2 days.

(21) Appl. No.: 14/169,324

(22) Filed: Jan. 31, 2014

(65) Prior Publication Data

US 2014/0285815 A1    Sep. 25, 2014

(30) Foreign Application Priority Data

Mar. 21, 2013  (KR) .................. 10-2013-0030306

(51) Int. Cl.
*G01B 11/25*    (2006.01)

(52) U.S. Cl.
CPC .......... *G01B 11/2513* (2013.01); *G01B 11/254* (2013.01)

(58) Field of Classification Search
USPC ............... 356/601–625; 250/559.07, 559.22, 250/237 G
See application file for complete search history.

(56) References Cited

U.S. PATENT DOCUMENTS

| | | | | |
|---|---|---|---|---|
| 5,307,151 A * | 4/1994 | Hof et al. | ....................... | 356/604 |
| 5,636,025 A * | 6/1997 | Bieman et al. | ................ | 356/619 |
| 5,825,495 A * | 10/1998 | Huber | ............................ | 356/600 |
| 6,031,661 A * | 2/2000 | Tanaami | ........................ | 359/368 |
| 6,291,817 B1 * | 9/2001 | Kobayashi et al. | ........ | 250/237 G |
| 6,763,133 B1 * | 7/2004 | Park et al. | ...................... | 382/154 |
| 7,189,984 B2 * | 3/2007 | Sawada | .................... | 250/559.07 |
| 7,436,524 B2 * | 10/2008 | Utsugi et al. | .................. | 356/603 |
| 7,440,119 B2 * | 10/2008 | Iwasaki | .......................... | 356/602 |
| 7,791,738 B2 * | 9/2010 | Ochi et al. | ...................... | 356/610 |
| 2002/0126390 A1 * | 9/2002 | Matsushita | .......... | G02B 3/0068 359/621 |
| 2004/0145753 A1 * | 7/2004 | Lim et al. | ....................... | 356/602 |
| 2004/0150837 A1 * | 8/2004 | Sugiyama | ..................... | 356/603 |

FOREIGN PATENT DOCUMENTS

| | | |
|---|---|---|
| JP | 2002-139310 A | 5/2002 |
| KR | 10-0121300 B1 | 8/1997 |
| KR | 10-2000-0065493 A | 11/2000 |
| KR | 10-2002-0068725 A | 8/2002 |
| KR | 10-2008-0076178 A | 8/2008 |
| KR | 10-2009-0067616 A | 6/2009 |
| KR | 10-2010-0052709 A | 5/2010 |
| KR | 10-2011-0017158 A | 2/2011 |

* cited by examiner

*Primary Examiner* — Sang Nguyen
(74) *Attorney, Agent, or Firm* — Lee & Morse, P.C.

(57) ABSTRACT

An apparatus for measurement of a three-dimensional (3D) shape includes a lens unit transmitting slit beams to a plurality of measurement objects, a light source unit irradiating the plurality of slit beams to the lens unit at different angles, an imaging unit obtaining images of the plurality of measurement objects formed by the slit beams irradiated on the plurality of measurement objects, and a calculation processing unit generating information regarding a 3D shape of the plurality of measurement objects from the images obtained by the imaging unit.

4 Claims, 18 Drawing Sheets

APPARATUS FOR MEASUREMENT OF THREE-DIMENSIONAL SHAPE

CROSS-REFERENCE TO RELATED APPLICATION

Korean Patent Application No. 10-2013-0030306, filed on Mar. 21, 2013, in the Korean Intellectual Property Office, and entitled: "Apparatus For Measurement of Three-Dimensional Shape," is incorporated by reference herein in its entirety.

BACKGROUND

1. Field

Embodiments relate to an apparatus for measurement of a three-dimensional (3D) shape.

2. Description of the Related Art

Laser trigonometry is a typical method of obtaining information regarding a three-dimensional (3D) shape of a measurement object (or a measurement target). Laser trigonometry is a method of obtaining information regarding a 3D shape of a measurement object from a two-dimensional (2D) image formed by slit beams on a surface of the measurement object.

SUMMARY

Embodiments provide a method for improving efficiency in a measurement operation of a three-dimensional (3D) shape measurement apparatus.

According to an aspect of embodiments, there is provided an apparatus for measurement of a three-dimensional (3D) shape, including: a lens unit transmitting slit beams to a plurality of measurement objects; a light source unit irradiating the plurality of slit beams to the lens unit at different angles; an imaging unit obtaining images of the plurality of measurement objects formed by the slit beams irradiated on the plurality of measurement objects; and a calculation processing unit generating information regarding a 3D shape of the plurality of measurement objects from the images obtained by the imaging unit.

The slit beams imaged on the plurality of measurement objects may be a plurality of slit beams, and the plurality of slit beams may be imaged on respective ones of the plurality of measurement objects.

The plurality of slit beams imaged on the plurality of measurement objects may be imaged to have an arrangement of n×1 overall, n being a natural number equal to or greater than 2.

The plurality of slit beams imaged on the plurality of measurement objects may imaged to have an arrangement of n×m overall, n and m being natural numbers equal to or greater than 2.

The lens unit may transmit a single slit beam that covers the plurality of measurement objects.

The light source unit may irradiate a plurality of slit beams to the lens unit at different angles, and the plurality of slit beams irradiated to the lens unit may be imaged on the plurality of measurement objects such that they have an overlap region to form the single slit beam.

The apparatus may further include a head unit, and the lens unit and the light source unit may be provided in the head unit.

The head unit may include an angle controller coupled to the light source unit to control angles at which the plurality of slit beams are irradiated to the lens unit.

The light source unit may include a plurality of light sources irradiating slit beams to the lens unit at different angles, and the head unit may further include a light source position controller changing a distance between the plurality of light sources.

The imaging unit may include a plurality of imaging units, the plurality of imaging units may obtain images of the plurality of measurement objects formed by the slit beams irradiated on the plurality of measurement objects, respectively.

The calculation processing unit may include a plurality of calculation processing units, each of the plurality of calculation processing units may generate information regarding a 3D shape of the plurality of measurement objects from the images obtained by the plurality of imaging units, respectively.

The apparatus may further include: transfer unit relatively moving slit beams on the imaged measurement object.

The lens unit may include an aberration correcting lens.

According to another aspect of embodiments, there is provided an apparatus for measurement of a three-dimensional (3D) shape, including: a lens unit transmitting slit beams to a plurality of measurement objects; a light source unit including a first light source irradiating a slit beam to the lens unit with a first irradiation angle and a second light source irradiating a slit beam to the lens unit with a second irradiation angle different from the first irradiation angle; an imaging unit obtaining images of the plurality of measurement objects formed by the slit beams irradiated on the plurality of measurement objects; and a calculation processing unit generating information regarding a three-dimensional (3D) shape of the plurality of measurement objects from the images obtained by the imaging unit.

The light source unit may further comprise a third light source irradiating a slit beam to the lens unit an angle different from the first and second irradiation angles.

According to yet another aspect of embodiments, there is provided an apparatus for measurement of a three-dimensional (3D) shape, including a lens unit configured to transmit slit beams toward a plurality of measurement objects, a light source unit configured to irradiate a plurality of slit beams toward the lens unit, the slit beams being incident on the lens unit at different angles from each other, an imaging unit above the measurement objects and configured to obtain images of the plurality of measurement objects formed by the slit beams irradiated on the plurality of measurement objects, and a calculation processing unit configured to generate information regarding a 3D shape of the plurality of measurement objects from the images obtained by the imaging unit.

The light source may include a first light source unit irradiating a slit beam to the lens unit at a first irradiation angle relative to a normal to the lens unit, and a second light source unit irradiating a slit beam to the lens unit at a second irradiation angle relative to a normal to the lens unit, the second irradiation angle being different from the first irradiation angle.

The apparatus may further include a third light source unit irradiating a slit beam to the lens unit an angle different from the first and second irradiation angles.

The apparatus may further include an angle controller configured to adjust angles at which the plurality of slit beams is irradiated on a same portion of the lens unit.

The angle controller may be configured to set the angles such that the plurality of slit beams have overlapping regions through the lens unit, the lens unit is transmitting a single slit beam to the plurality of measurement objects.

BRIEF DESCRIPTION OF THE DRAWINGS

The above and other aspects and features will be more clearly understood from the following detailed description taken in conjunction with the accompanying drawings, in which.

DETAILED DESCRIPTION

Figure 1:
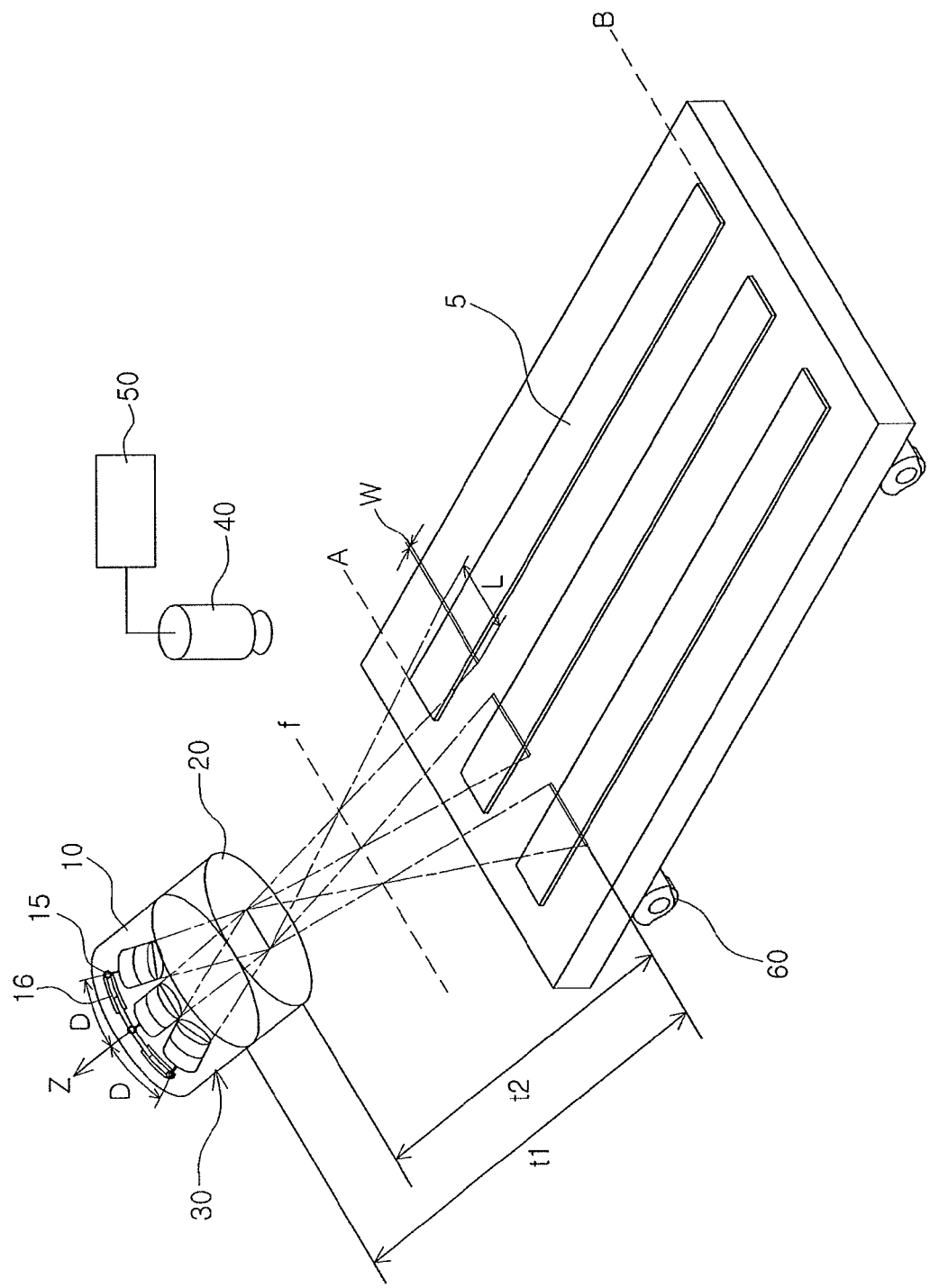
FIG. 1 illustrates a view of an apparatus for measurement of a three-dimensional (3D) shape according to an embodiment.

Embodiments will now be described in detail with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a view of an apparatus for measurement of a three-dimensional (3D) shape according to an embodiment.

Referring to FIG. 1, an apparatus for measurement of a 3D shape according to embodiments may include a light source unit 10, a lens unit 20, an imaging unit 40, and a calculation processing unit 50.

The light source unit 10 implements a plurality of slit beams to irradiate the same to the lens unit 20. Here, the plurality of slit beams is irradiated to the lens unit 20 at different angles.

The respective slit beams may be linear light having a predetermined width and length implemented by concentrating light emitted from a laser diode by a condensing lens and subsequently allowing the concentrated light to pass through a cylindrical lens. But embodiments are not limited thereto.

The lens unit 20 may transmit the plurality of slit beams, e.g., the amount of slit beams, irradiated from the light source unit 10 to the measurement object 5, but embodiments are not limited thereto. Here, the dotted line f in FIG. 1 indicates a focal plane.

The lens unit 20 may further improve linearity of the slit beams imaged on the measurement objects 5. In detail, as a distance t1 between the light source unit 10 and the positions of the measurement objects 5, at which an image is formed, is increased, linearity of the slit beams imaged on the measurement objects 5 may be reduced due to spreading of light. Therefore, the lens unit 20 disposed in a light path of the slit beams, which are irradiated from the light source 10 to be imaged on the measurement objects 5, concentrates the irradiated slit beams, and subsequently, images them on the measurement objects 5. Accordingly, the quality of the plurality of slit beams imaged on the measurement objects 5 can be improved.

In the present embodiment, the plurality of measurement objects 5 may be provided, and the plurality of slit beams irradiated from the light source unit 10 to the lens unit 20 may be transmitted through the lens unit 20 and imaged on the plurality of measurement objects 5.

Here, an irradiation angle, at which the plurality of slit beams are irradiated to the lens unit 20 from the light source unit 10, may be adjusted to allow the plurality of slit beams to be matched to the plurality of measurement objects 5 to form an image thereon, respectively. For example, the light source unit 10 may irradiate a plurality of slit beams at a predetermined angle with respect to a lens axis Z of the lens unit 20, such that the plurality of slit beams are formed on each of the plurality of measurement objects 5. Details thereof will be described later with reference to FIGS. 2A through 2D.

As illustrated, the lens unit 20 may be disposed such that the lens axis Z of the lens unit 20 has a predetermined difference in angles with respect to a vertical direction of a plane in which the measurement objects 5 are disposed. However, embodiments are not limited thereto and the lens unit 20 may be disposed such that the lens axis Z thereof is identical to the vertical direction of the plane in which the measurement objects 5 are disposed.

Meanwhile, the light source unit 10 and the lens unit 20 may be integrally provided within the head unit 30 in which they are coupled. Namely, the apparatus for measurement of a 3D shape according to the present embodiment may be understood to include a single head unit 30, and the light source unit 10 and the lens unit 20 may be combined within the single head unit 30 into a single and integrated unit.

Hereinafter, the light source unit 10 and the lens unit 20 according to the present embodiment will be described in detail with reference to FIGS. 2A through 2D.

FIGS. 2A through 2D illustrate views of the light source unit 10 and the lens unit 20 of the apparatus for measurement of a 3D shape, and positions in which a plurality of slit beams are imaged according to an embodiment. In the present embodiment, the light source unit 10 and the lens unit 20 are provided within the single head unit 30.

Figure 2A:
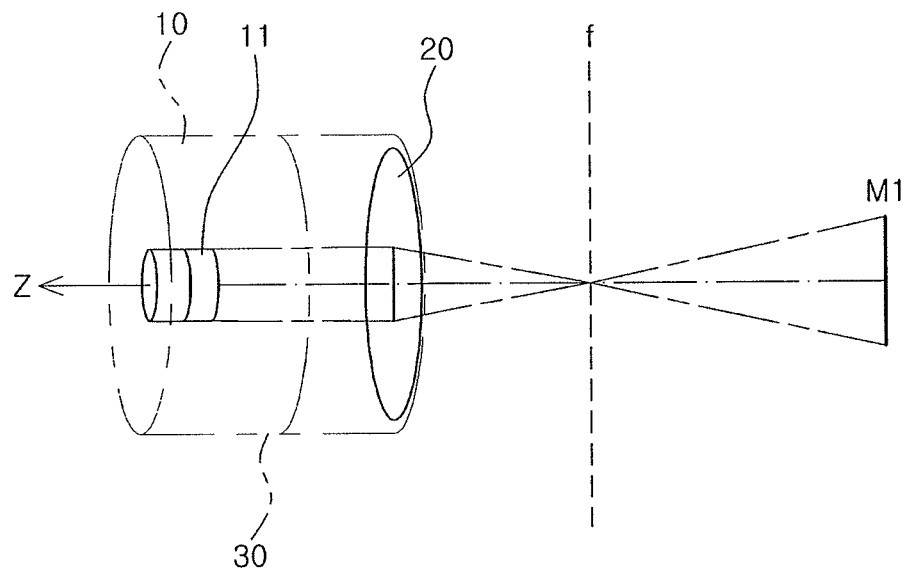
FIGS. 2A through 2D illustrate views of a light source unit and a lens unit according to an embodiment.
Figure 2B:
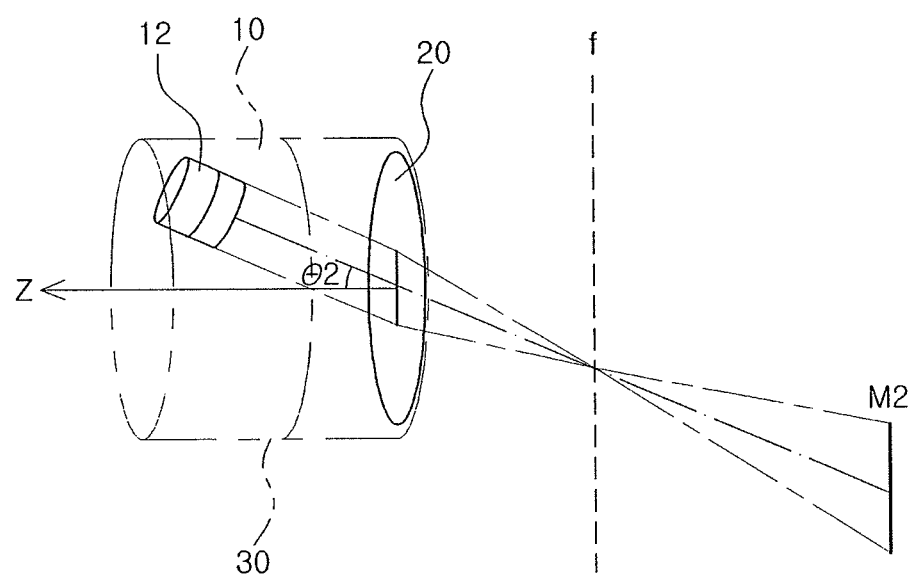
Figure 2C:
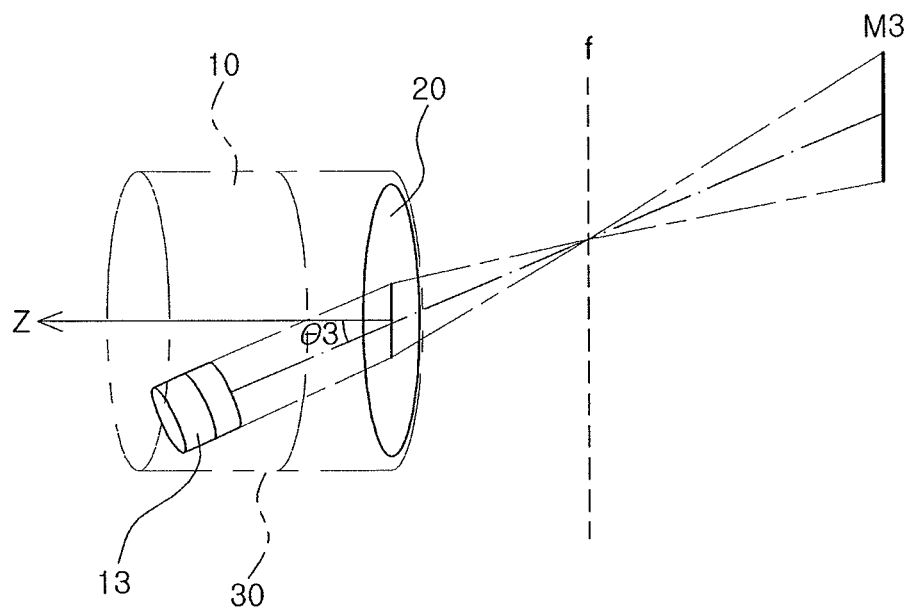

First, referring to FIGS. 2A through 2C, the light source unit 10 may include first, second, and third light sources 11, 12, and 13 irradiating a slit beam to the lens unit 20, respectively. Here, the first, second, and third light sources 11, 12, and 13 may be disposed to have different irradiation angles with respect to the lens unit 20, respectively.

In detail, as illustrated in FIG. 2A, the first light source 11 irradiates a slit beam to the lens unit 20. As illustrated in FIG. 2A, the slit beam may be irradiated to be parallel to the lens axis Z, i.e., without having a substantial difference in angles from the lens axis Z of the lens unit 20.

Figure 2D:
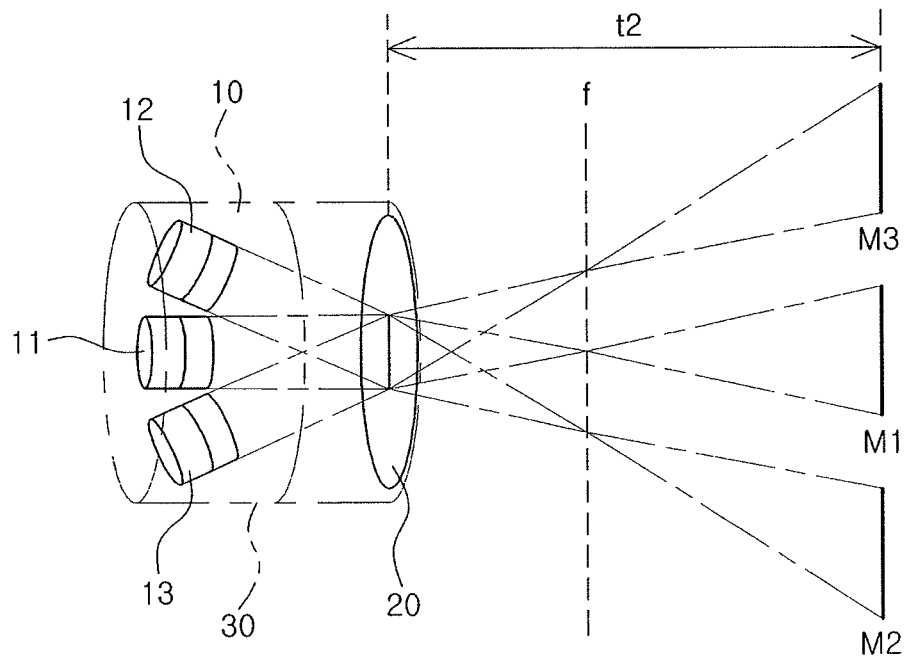

As illustrated in FIGS. 2B and 2C, the second and third light sources 12 and 13 may be disposed such that they irradiate slit beams to the lens unit 20 at predetermined angles θ2 and θ3 with respect to the lens axis Z, respectively. In this case, as illustrated in FIG. 2D, the slit beams output from the first, second, and third light sources 11, 12, and 13 are imaged in positions M1, M2, and M3, respectively, through the lens unit 20.

In the present embodiment, in a case in which the distances between the positions M1, M2, and M3, i.e., positioned where beams are imaged, are required to be increased or decreased, the angles θ2 and θ3 between slit beams irradiated from the second and third light sources 12 and 13 and the lens axis Z may be increased or decreased. In other words, the angles θ2 and θ3 may be adjusted to provide desired distances between the positions M1, M2, and M3.

To this end, in the present embodiment, as illustrated in FIG. 1, the head unit 30 may further include an angle controller 15 coupled to the light source unit 10 to control irradiation angles at which the plurality of slit beams are irradiated to the lens unit 20. For example, the angle controller 15 may be a mechanical means that may be able to apply displacement to the angles θ2 and θ3 between the plurality of light sources 11, 12, and 13, and the lens axis Z, respectively, but embodiments are not limited thereto.

Also, as illustrated in FIG. 1, the head unit 30 may further include a light source position controller 16 that changes a distance D between the plurality of light sources 11, 12, and 13 included in the light source unit 10. Slit beams imaged on the measurement objects 5 can be more precisely controlled by changing the distance D between the plurality of light sources 11, 12, and 13.

As mentioned above, the light source unit 10, the lens unit 20, the angle controller 15, and the light source position controller 16 may be integrally provided in the single head unit 30, but embodiments are not limited thereto.

Meanwhile, in the present embodiment, the light source unit 10 may irradiate a plurality of slit beams to the lens unit 20 at different angles and the lens unit 20 may image a single slit beam on the plurality of measurement objects 5 through a single slit beam. This will be described in detail with reference to FIG. 3.

Figure 3:
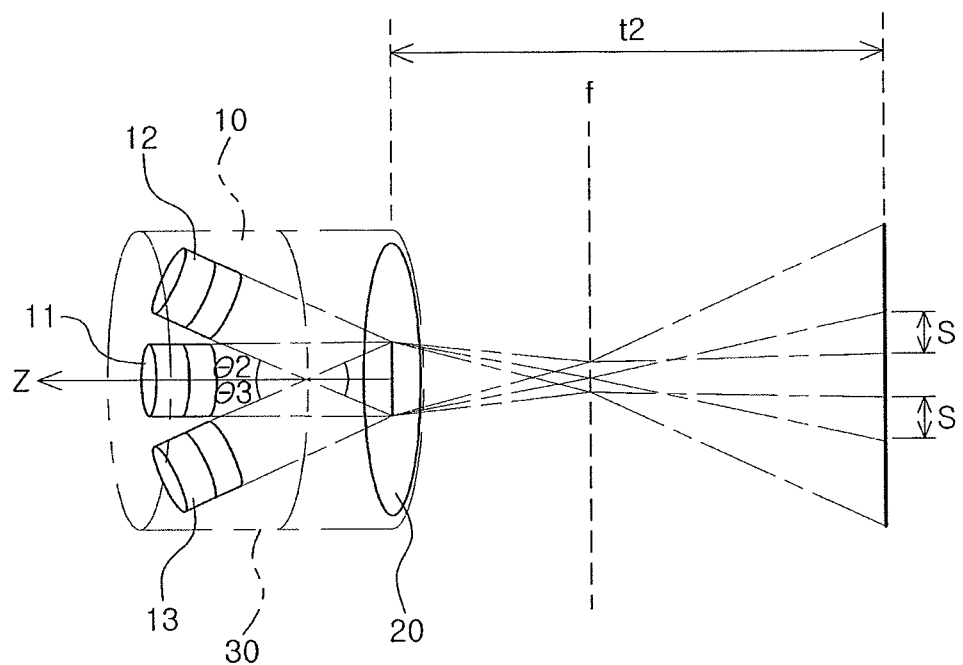
FIG. 3 illustrates an example of an apparatus for measurement of a 3D shape according to another embodiment.

Referring to FIG. 3, the apparatus for measurement of a 3D shape according to the present embodiment may include the head unit 30. Here, the head unit 30 may include the light source unit 10 irradiating a plurality of slit beams to the lens unit 20 at different irradiation angles, and the lens unit 20 transmitting the plurality of slit beams irradiated from the light source unit 10, as a single slit beam, on the plurality of measurement objects 5.

This may be implemented by appropriately adjusting irradiation angles between the plurality of slit beams irradiated from the light source unit 10. In other words, the irradiation angles θ2 and θ3 at which the plurality of slit beams are irradiated to the lens unit 20 may be set such that the slit beams have overlapping regions S in the positions in which the slit beams are imaged through the lens unit 20. In this case, the single slit beam having linearity and a length sufficient to be imaged on the plurality of measurement objects 5 may be obtained.

Hereinafter, other configurations of the apparatus for measurement of a 3D shape according to the present embodiment will be described with reference to FIG. 1.

As illustrated in FIG. 1, the apparatus for measurement of a 3D shape according to the present embodiment may further include the imaging unit 40 obtaining images of the plurality of measurement objects formed by the slit beams irradiated on the plurality of measurement objects 5. The imaging unit 40 may obtain a trace image of a slit beam image formed on the measurement objects 5. Here, the imaging unit 40 may be, e.g., a CCD camera.

The imaging unit 40 may be disposed directly above the measurement objects 5. However, embodiments are not limited thereto and the imaging unit 40 may be disposed to have a predetermined difference in angles from a vertical direction of a plane in which the measurement objects 5 are disposed.

The calculation processing unit 50 generates information regarding a 3D shape of the measurement objects 5 from an image obtained by the imaging unit 40. Here, the calculation processing unit 50 may be programmed to generate the information regarding the 3D shape of the measurement objects 5 through laser trigonometry from the obtained image.

Meanwhile, in order to measure a 3D shape of the entire surface of the measurement objects 5 by using laser trigonometry as in the present embodiment, it is necessary to irradiate slit beams from a first end A to a second end B of each of the measurement objects 5 to obtain a trace image formed by the slit beams. Thus, the apparatus for measurement of a 3D shape according to the present embodiment may further include a transfer unit 60 for relatively moving the measurement objects 5 and the slit beams imaged on the measurement objects 5.

In the present embodiment, the transfer unit 60 is illustrated to move the plurality of measurement objects 5. However, embodiments are not limited thereto and the transfer unit 60 may be implemented to move the head unit 30 including the light source unit 10 and the lens unit 20.

Hereinafter, a measurement principle and an effect of the apparatus for measurement of a 3D shape according to the present embodiment will be described in detail with reference to FIGS. 4A and 4B.

Figure 4A:
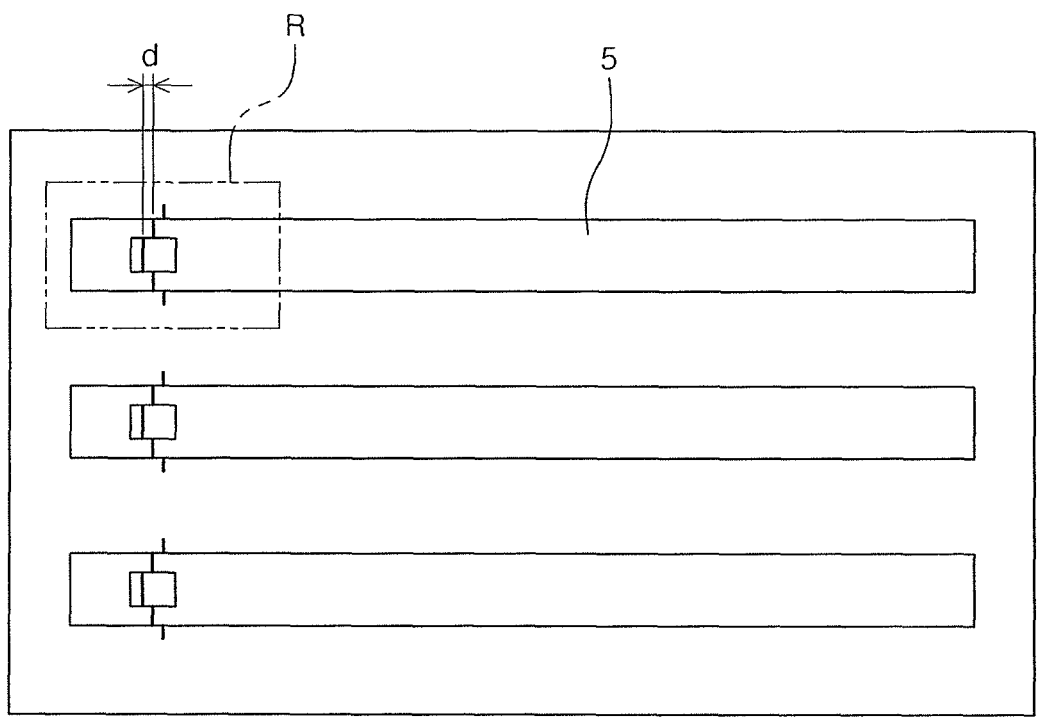
FIGS. 4A and 4B illustrate views illustrating measurement principles and effects of the apparatus for measurement of a 3D shape according to an embodiment.
Figure 4B:
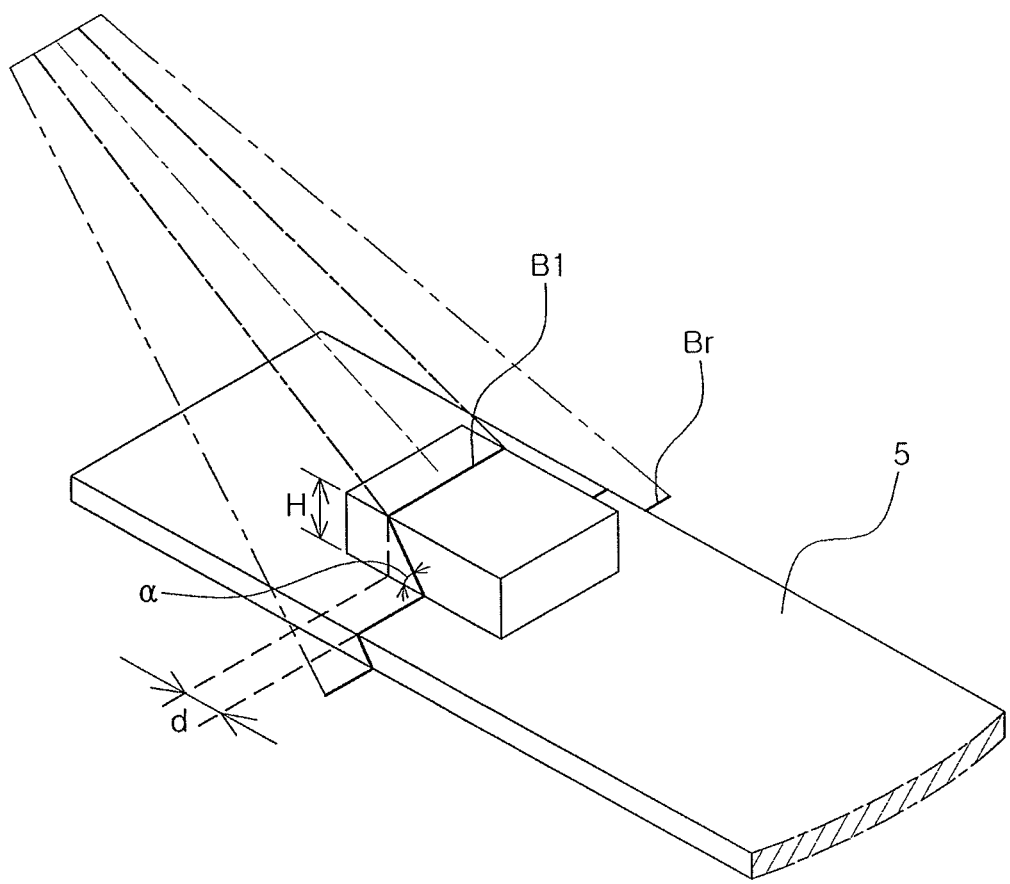

FIG. 4A illustrates a top view of the plurality of slit beams imaged on the plurality of measurement objects 5, and FIG. 4B illustrates a solid, enlarged perspective view of a region 'R' in FIG. 4A.

First, referring to FIG. 4B, when linear slit beams are irradiated to the measurement object 5, an altered form of the linear slit beams according to a 3D shape of the measurement object 5 is illustrated (the linear slit beams are altered according to a 3D shape of the measurement object 5). For example, referring to FIG. 4B, when slit beams are irradiated from the lens unit 20 disposed in the left side of the measurement object 5 toward the measurement object 5, the slit beams first come into contact with the most protruded portion of the measurement object 5 so as to be imaged. Here, it can be seen that an imaged slit beam Bl deviates to the left, relative to a slit beam Br imaged on a reference surface without a protrusion.

Here, the imaging unit 40 obtains images of the plurality of measurement objects formed by the slit beams irradiated on the measurement object 5. When the imaging unit 40 is disposed right above the measurement object 5, an image obtained therefrom may be that as illustrated in FIG. 4A.

The calculation processing unit 50 may be programmed to generate information regarding the 3D shape including a step H, a tilt angle, and the like, of the measurement object 5 on the basis of an angle α at which the slit beams are irradiated to the measurement object 5, and a deviation distance d of the imaged slit beams.

Conventionally, in order to obtain information regarding a 3D shape of the entire surface of the measurement object 5 by using laser trigonometry, slit beams are irradiated from the first end A to the second end B of the measurement object 5 to obtain a trace image formed by the slit beams, thereby requiring a great amount of time for measurement.

In order to improve this, a conventional method includes extendedly forming slit beams by increasing a distance t2 (FIG. 1) between the lens unit 20 and the position of the measurement object 5 in which the slit beams are imaged, and transmitting a single slit beam to the plurality of measurement objects 5. In this case, however, a width W of the slit beams, as well as a length L thereof, is increased, which may degrade precision in measurement of the 3D shape.

Therefore, according to an embodiment illustrated in FIG. 2D, the light source 10 may be configured to irradiate a plurality of slit beams to the lens unit 20 at different angles so that a plurality of slit beams are output from the single lens unit 20. As such, the plurality of slit beams are incident on the lens unit 20 at different angles (e.g., angles at which the plurality of slit beams are incident on the lens unit 20 are set to be different from each other) so as to be imaged on the plurality of separated measurement objects 5, respectively. In this case, the plurality of measurement objects 5 can be simultaneously measured in parallel without having to increase the distance t2 between the lens unit 20 and the position of the measurement objects 5 in which the slit beams are imaged, more than is necessary. Therefore, the time required for the measurement can be considerably reduced.

For example, referring to FIG. 4A, a plurality of slit beams are imaged on the plurality of measurement objects 5, e.g., the slit beams may be imaged to have an arrangement of 3×1. In this case, three measurement objects 5 can be measured through a single scanning operation, significantly improving operational efficiency. Also, the plurality of slit beams may be imaged on the plurality of measurement objects 5 to have an arrangement of n×1 (n is a natural number equal to or greater than 2) overall, but the embodiments are not limited thereto.

Also, according to the embodiment illustrated in FIG. 3, a single slit beam having a length sufficient for simultaneous measurement of the plurality of measurement objects 5 in parallel can be obtained without having to increase the distance t2 between the lens unit 20 and the position of the measurement object in which the slits beams are imaged. Thus, the time required for the measurement and precision of the measurement results can be improved.

Figure 5:
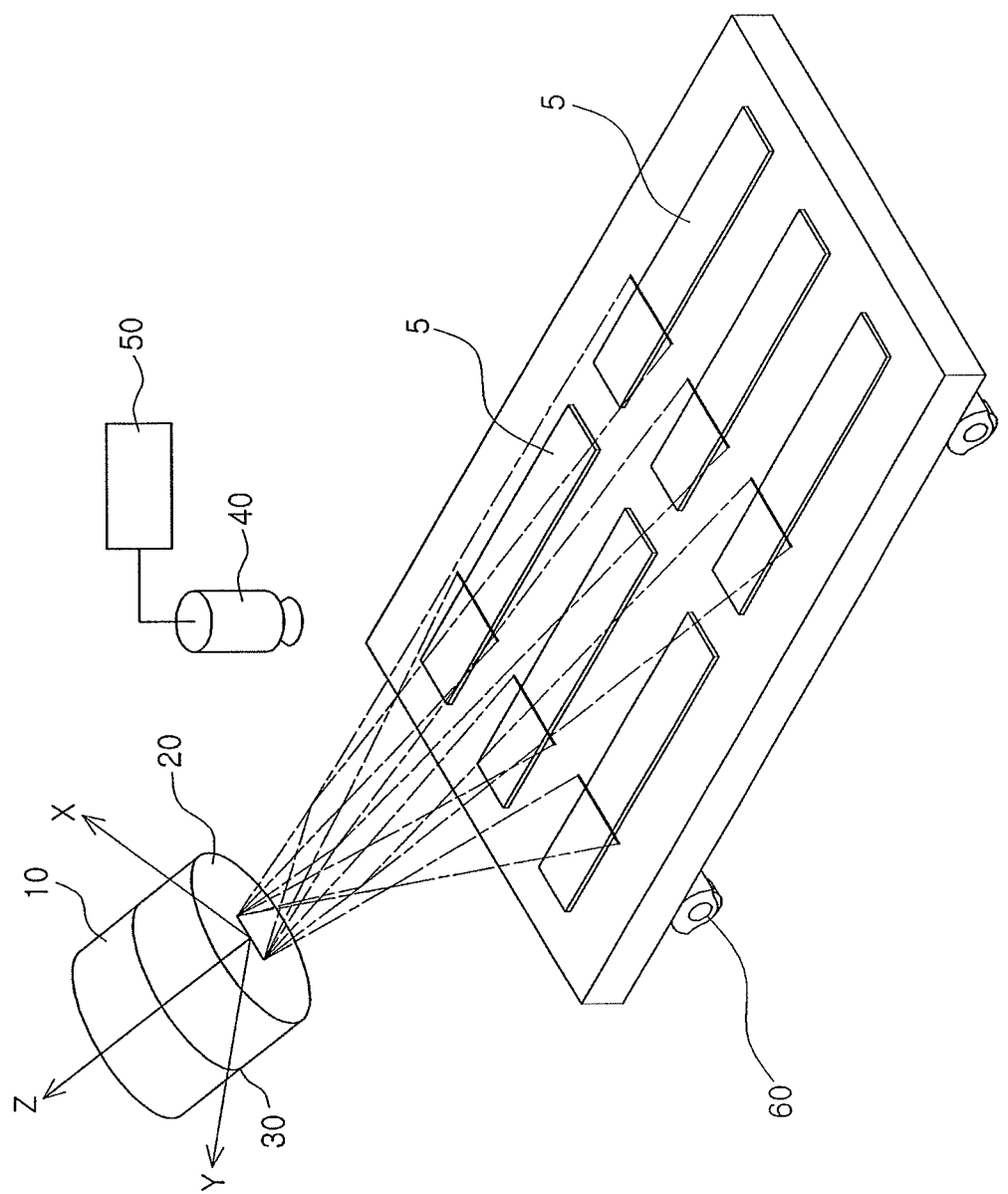
FIGS. 5 and 6 illustrate views of an apparatus for measurement of a 3D shape according to another embodiment.

FIG. 5 illustrates a view of an apparatus for measurement of a 3D shape according to another embodiment.

Referring to FIG. 5, a plurality of slit beams has an arrangement of n×m (n and m are natural numbers equal to or greater than 2) overall and is imaged on the plurality of measurement objects 5. For example, as illustrated in FIG. 5, the plurality of slit beams may have an arrangement of 3×2 overall and may be imaged to the plurality of measurement objects 5, respectively.

In detail, a plurality of slit beams having predetermined angles in at least one axial direction among X axis and Y axis with respect to the lens axis Z may be irradiated from the light source unit 10 to the lens unit 20. For example, in the present embodiment, six measurement objects 5 may be measured through a single scanning operation, effectively improving operational efficiency.

Meanwhile, unlike the former embodiment, a plurality of imaging units and a plurality of calculation processing units may be provided. This will be described in detail with reference to FIG. 6.

Figure 6:
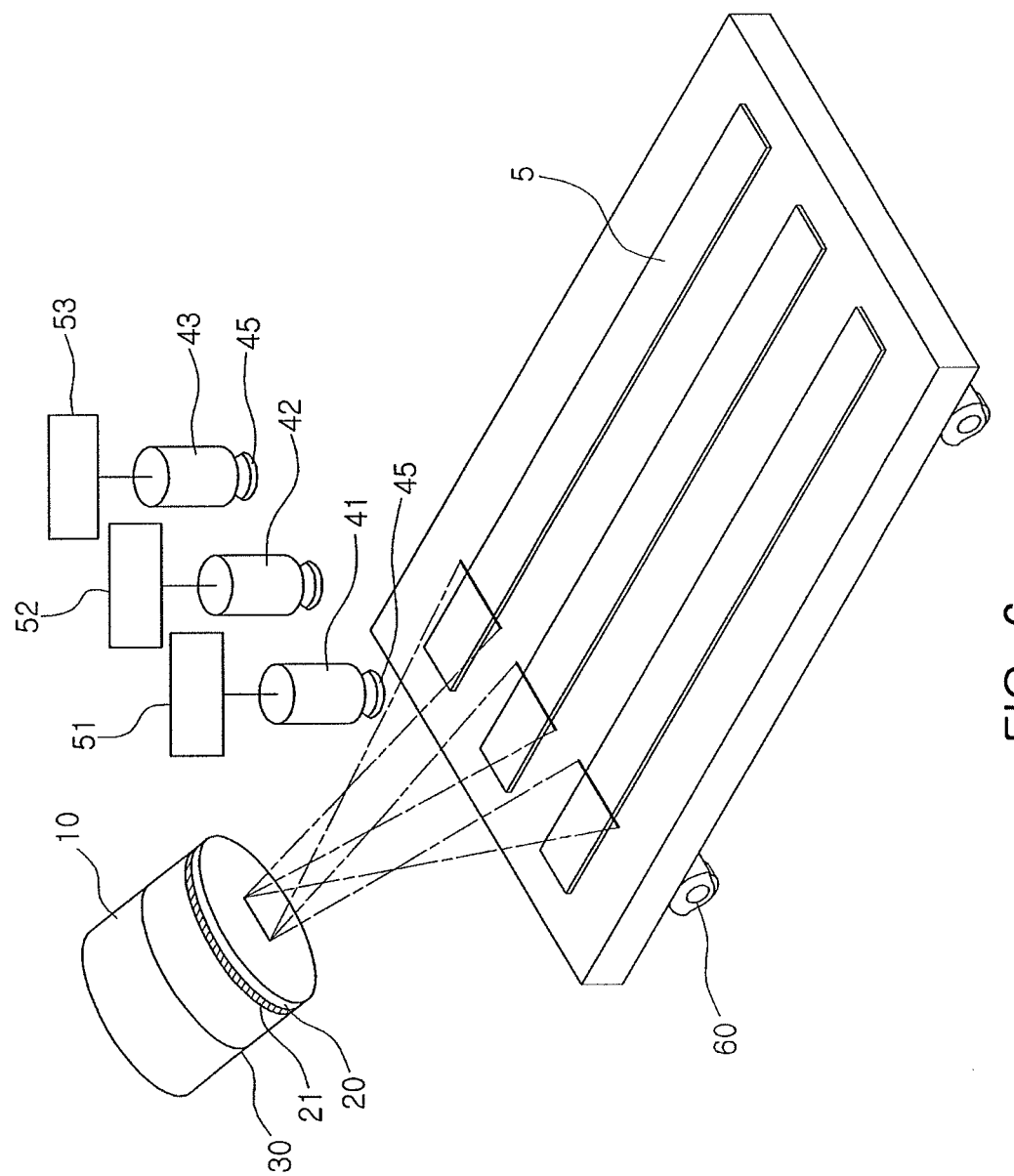

FIG. 6 illustrates a view of an apparatus for measurement of a 3D shape according to another embodiment.

Referring to FIG. 6, the apparatus for measurement of a 3D shape according to the present embodiment may include the light source unit 10, the lens unit 20, the imaging units, and the calculation processing units. Here, a plurality of imaging units and a plurality of calculation processing units may be provided, and this embodiment will be described. The light source unit 10 and the lens unit 20 may be provided in a single head unit 30 combining them.

According to the embodiment of FIG. 6, a plurality of imaging units 41, 42, and 43 may obtain images of the plurality of measurement objects formed by the slit beams irradiated on the plurality of measurement objects 5. Here, like the plurality of imaging units 41, 42, and 43, a plurality of calculation processing units may be provided, and the respective calculation processing units 51, 52, and 53 may generate information regarding a 3D shape of the plurality of measurement objects from images obtained by the plurality of imaging units 41, 42, and 43, respectively.

In this case, since the amount of measurement objects to be calculated by a single calculation processing unit is reduced, an overload of the calculation processing units 51, 52, and 53 may be reduced. Further, stability and speed of the measurement apparatus can be improved.

Also, in the present embodiment, the lens unit 20 may include an aberration correcting lens 21. Here, aberration refers to chromatic aberration, spherical aberration, astigmatism, and the like, and with the presence of the aberration correcting lens 21, slit beams having improved linearity and clarity may be obtained.

Also, in the present embodiment, the imaging units 41, 42, and 43 may include a filter unit 45 as a means for clearly obtaining an image of the slit beams irradiated on the measurement objects 5. The filter unit 45 may be, e.g., at least one of a polarization filter and a neutral density (ND) filter, but the embodiments are not limited thereto.

According to the present embodiment, since the plurality of measurement objects 5 can be simultaneously measured in parallel, the apparatus for measurement of a 3D shape having improved reliability of the measurement results can be obtained.

Hereinafter, a utilization example of the apparatus for measurement of a 3D shape according to an embodiment will be described. However, a usage of the apparatus for measurement of a 3D shape according to the present embodiment is not limited thereto.

Utilization Example 1 of an Apparatus for Measurement of a 3D Shape

For example, the measurement object 5 may be a light emitting device, in which a light emitting device package is mounted thereon. This will be described in detail with reference to FIGS. 7 through 12B.

Figure 7:
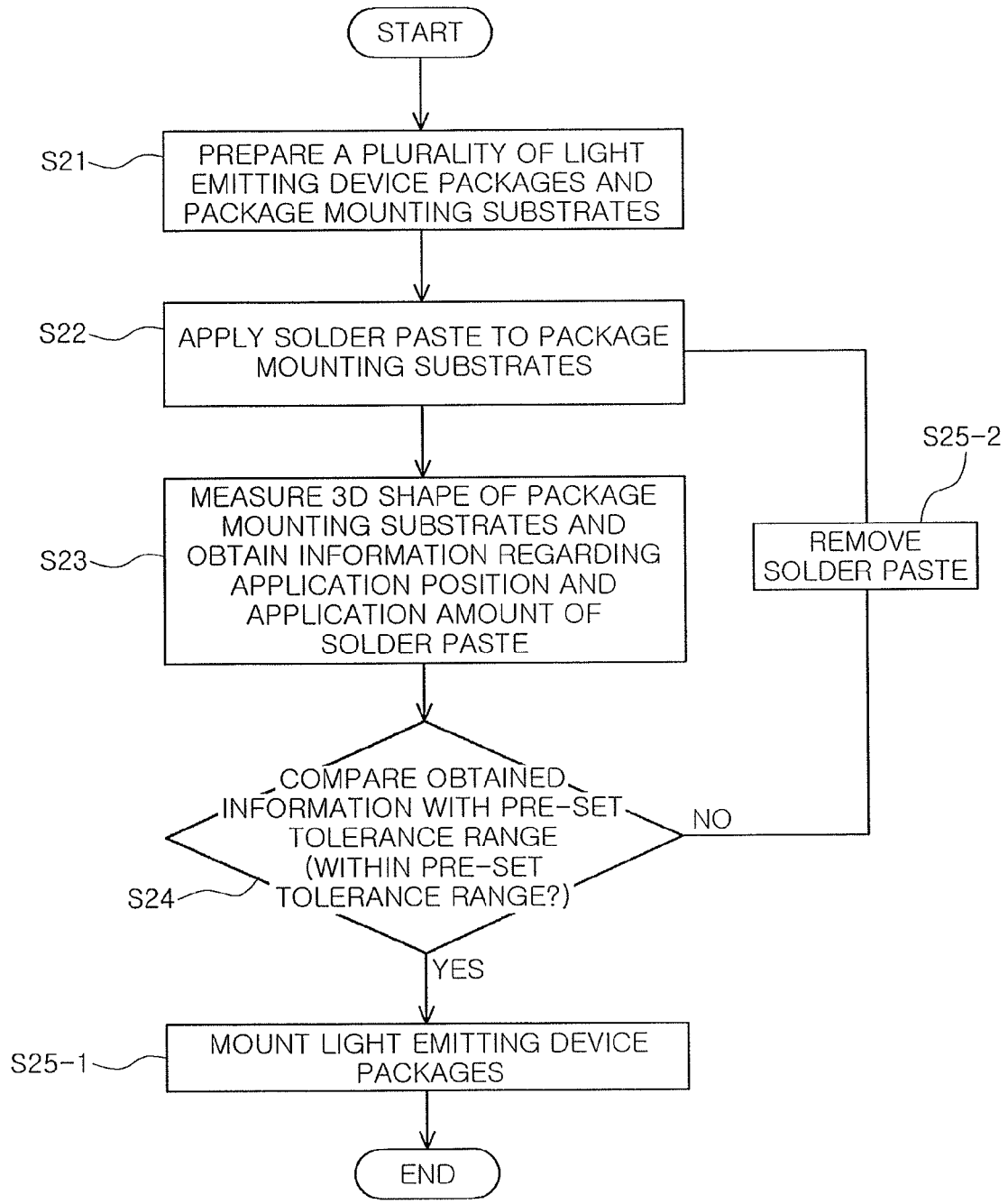
FIG. 7 illustrates a flow chart of manufacturing a light emitting device by using the apparatus for measurement of a 3D shape according to an embodiment.

FIG. 7 illustrates a flow chart of stages in a method of manufacturing a light emitting device by using the apparatus for measurement of a 3D shape according to an embodiment.

Referring to FIG. 7, a method for manufacturing a light emitting device according to an embodiment may include an operation (S21) of preparing a plurality of light emitting device packages and a plurality of package mounting substrates, an operation (S22) of applying a solder paste to the plurality of package mounting substrates, an operation (S23) of measurement of a 3D shape of the plurality of package mounting substrates with the solder paste coated thereon to obtain information regarding at least one of an application position and an application amount of the solder paste, an operation (S24) of comparing the obtained information with a pre-set tolerance range, and an operation (S25-1) of mounting the light emitting device packages on the package mounting substrates when the obtained information satisfies the tolerance range and an operation (S25-2) of removing the solder paste coated on the package mounting substrates when the obtained information exceeds the tolerance range.

Hereinafter, respective operations will be described in detail with reference to FIGS. 8A through 12B.

Figure 8A:
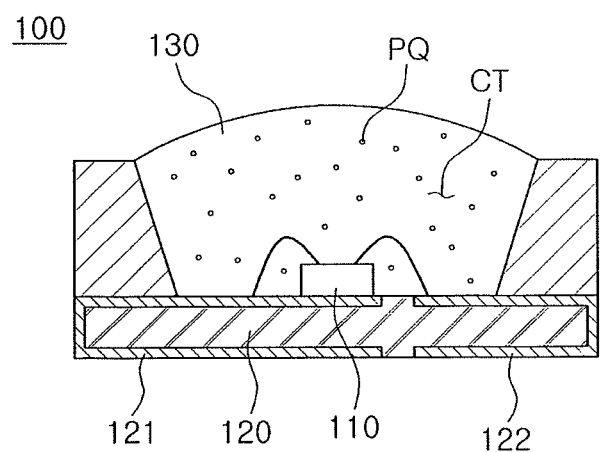
FIGS. 8A-8B, 9, and 10 illustrate views of stages in a method for manufacturing a light emitting device according to the embodiment of FIG. 7.
Figure 8B:
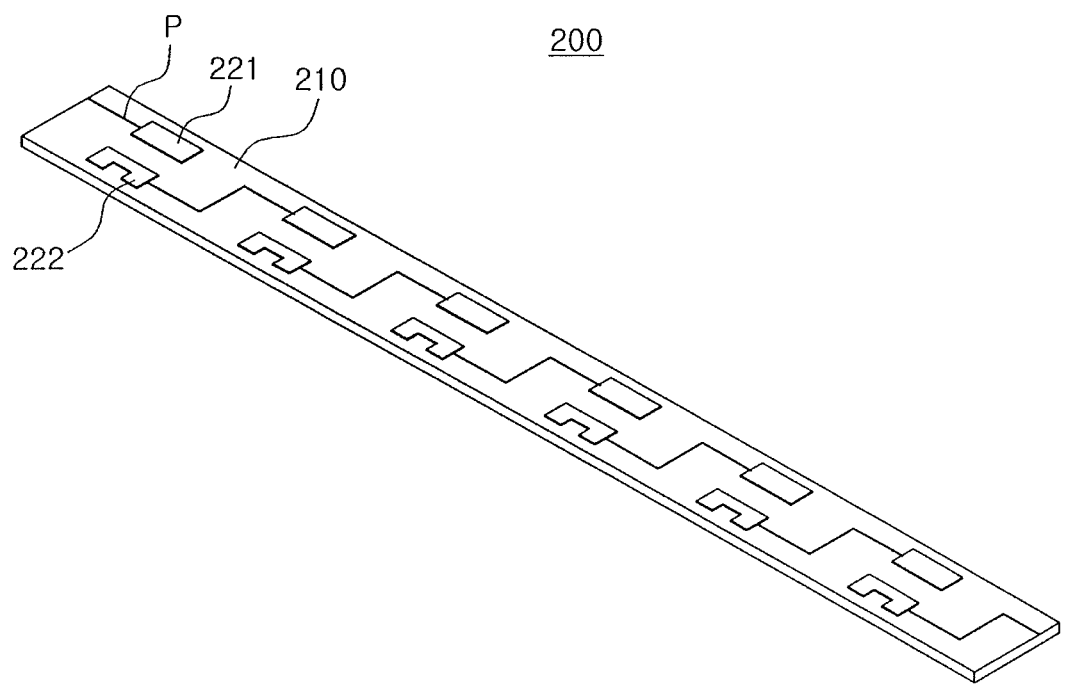

First, the method for manufacturing a light emitting device starts with operation (S21) of preparing a plurality of light emitting device packages 100 and a plurality of package mounting substrates 200. FIGS. 8A and 8B illustrate the light emitting device package 100 and the package mounting substrate 200.

Referring to FIG. 8A, the light emitting device package 100 according to the present embodiment may include a light emitting device 110, a package body 120 in which a cavity CT with the light emitting device 110 accommodated therein is formed, and a resin unit 130 filling the cavity CT. Of course, embodiments are not limited thereto and the light emitting device package 100 according to the present embodiment may be a chip-scale package (CSP) implemented by light emitting device chip unit.

The light emitting device 110 may be any photoelectric device as long as it can emit light when an electrical signal is applied thereto. Typically, the light emitting device 110 may be a semiconductor light emitting device in which a semiconductor layer is epitaxially grown on a growth substrate. For example, the light emitting device may include an n-type semiconductor layer, a p-type semiconductor layer, and an active layer disposed therebetween, but embodiments are not limited thereto. Also, the active layer may include a nitride semiconductor including $In_xAl_yGa1-x-yN$ ($0 \leq x \leq 1$, $0 \leq y \leq 1$, $x+y \leq 1$) having a single or multi-quantum well structure.

The package body 120 may include the cavity CT accommodating the light emitting device 110 and first and second electrode units 121 and 122. The package body 120 may be formed of a resin which is opaque or has a high degree of reflectivity, and may be formed of a polymer resin easy for an injection molding process. However, embodiments are not limited thereto and the package body 120 may be made of various other non-conductive materials.

The resin unit 130 filling the cavity CT may be formed of a light-transmissive resin, e.g., a silicone, an epoxy, or the like, and may include wavelength conversion materials PQ emitting light having different wavelengths upon being excited by light emitted from the light emitting device 110. In this case, the wavelength conversion materials PQ may be at least one of, e.g., phosphors and quantum dots.

Meanwhile, referring to FIG. 8B, the package mounting substrate 200 according to the present embodiment may include a circuit board 210 allowing the light emitting device package 100 to be mounted thereon, e.g., the circuit board 210 may be a printed circuit board (PCB). The circuit board 210 may be made of a material, e.g., FR-4, CEM-3, or the like, but embodiments are not limited thereto, e.g., the circuit board 210 may be formed of glass, an epoxy material, a ceramic material, or the like. The package mounting substrate 200 may have a wiring pattern P for applying an electrical signal to the first and second electrode units 121 and 122 and first and second pad units 221 and 222 disposed to be in electrical contact with the first and second electrode units 121 and 122 of the light emitting device package 100.

Figure 9:
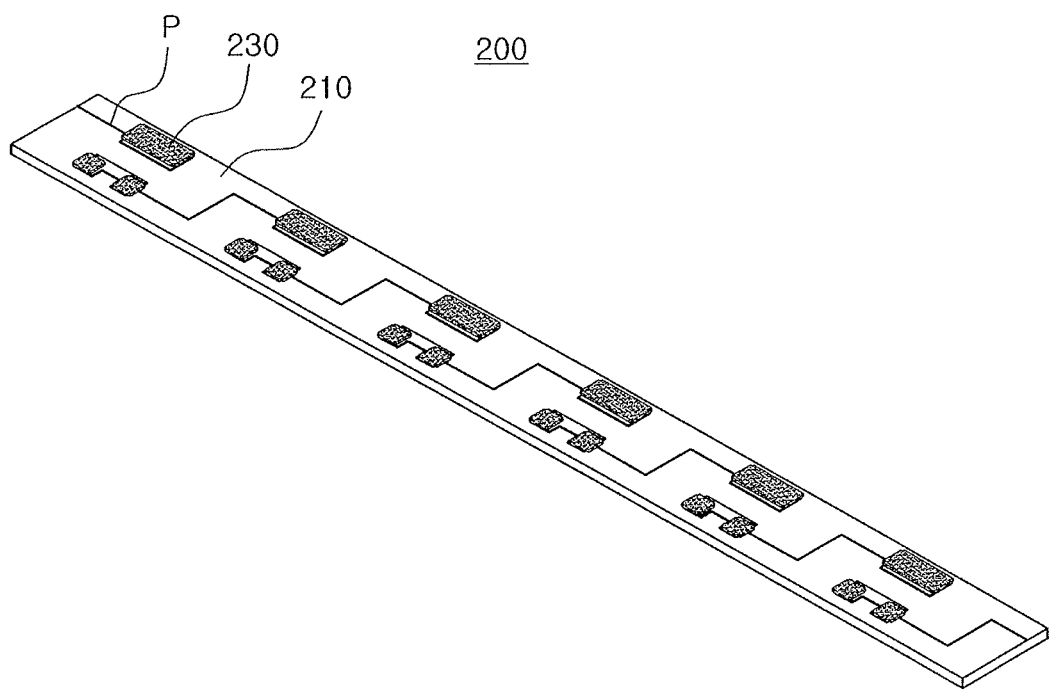

Thereafter, as illustrated in FIG. 9, a solder paste is applied to the plurality of package mounting substrates 200 (S22). The solder paste 230 may be applied to regions of the package mounting substrate 200 in which the first and second pad units 221 and 222 are positioned, by using a screen printing process.

Figure 10:
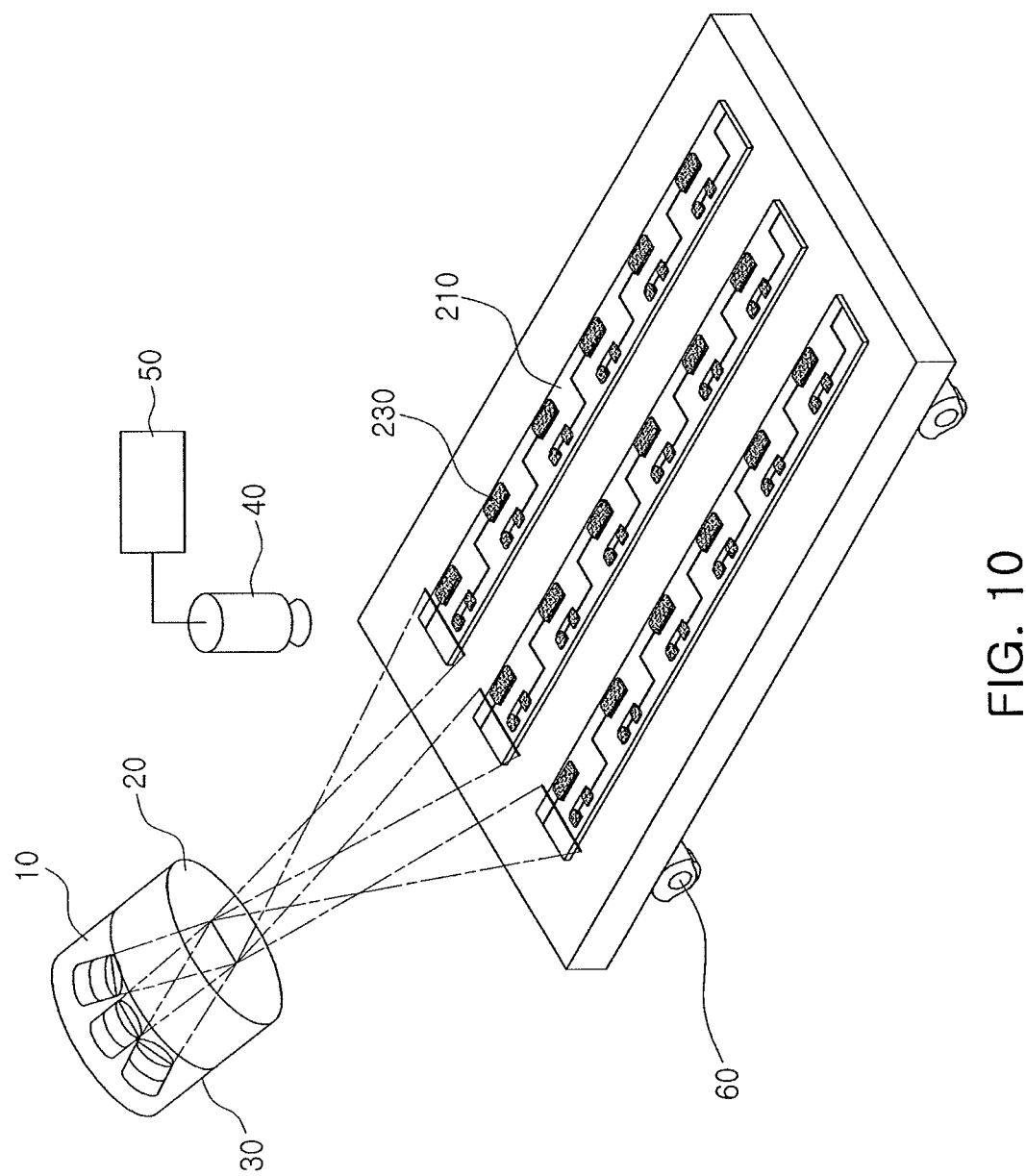

Thereafter, as illustrated in FIG. 10, a 3D shape of the plurality of package mounting substrates 200 with the solder paste 230 coated thereon is measured to obtain information regarding at least one of an application position and an application amount of the solder paste 230 (S23).

Figure 11:
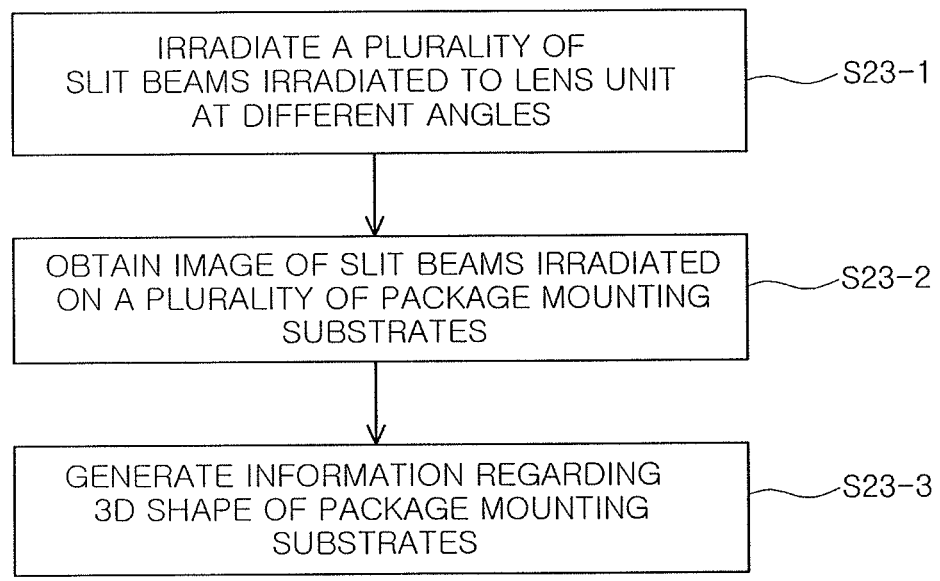
FIG. 11 illustrates a flow chart of obtaining at least one type of information regarding an application position and an application amount of a solder paste in the embodiment of FIG. 7.

In this case, as illustrated in FIG. 11, the operation (S23) may include an operation (S23-1) of irradiating a plurality of slit beams at different angles to lens unit 20, such that the slit beams are transmitted through the lens unit 20 and imaged on the plurality of package mounting substrates 200, an operation (S23-2) of obtaining images of the plurality of measurement objects formed by the slit beams irradiated on the plurality of package mounting substrates 200, and an operation (S23-3) of generating information regarding a 3D shape of the package mounting substrates 200 from the obtained image. The slit beams imaged on the plurality of package mounting substrates 200 may be a plurality of slit beams, but embodiments are not limited thereto.

Here, based on the obtained information regarding the 3D shape of the package mounting substrates 200, it may be determined whether an appropriate amount of solder paste 230 has been applied to desired positions on the package mounting substrates 200.

According to the present embodiment, since the plurality of package mounting substrates 200 can be measured in parallel, efficiency in the manufacturing process can be improved.

Figure 12A:
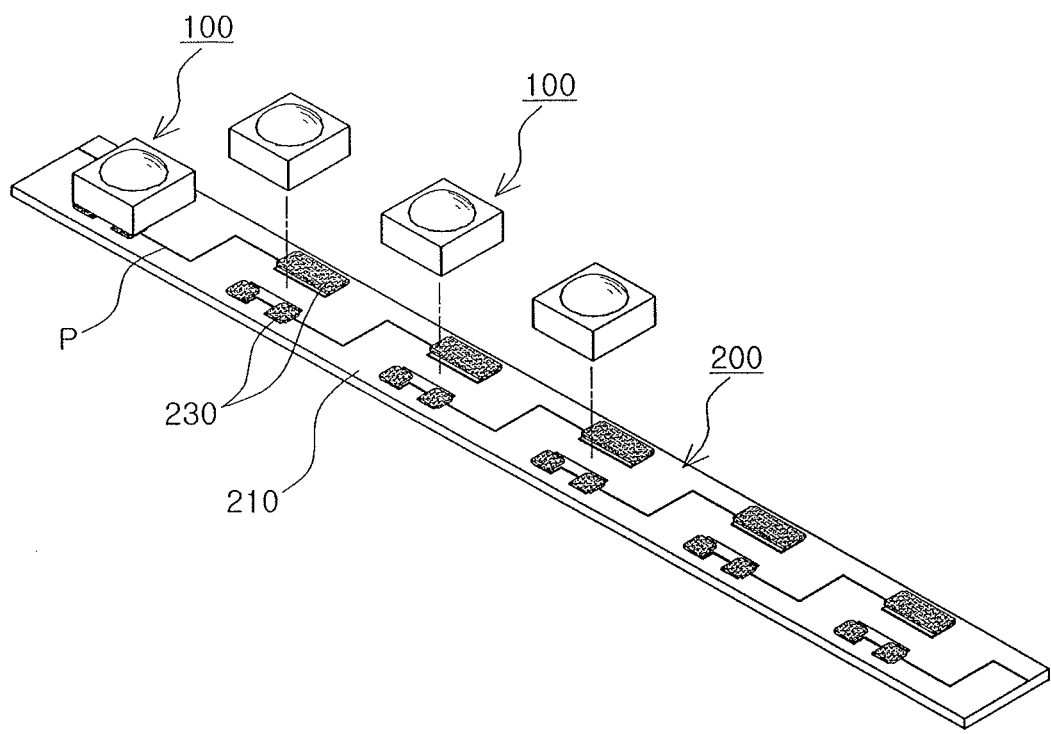
FIGS. 12A and 12B illustrate views of an operation performed after obtaining the at least one type of information regarding an application position and an application amount of a solder paste in the embodiment of FIG. 7.

Thereafter, the information regarding any one of the application position and the application amount of the solder paste 230 obtained from the information regarding the 3D shape of the package mounting substrates 200 is compared with a pre-set tolerance range (S24). When the information satisfies the tolerance range, the light emitting device packages 100 may be mounted on the package mounting substrates 200 as illustrated in FIG. 12A (S25-1).

Here, the operation (S25-1) of mounting the light emitting device packages 100 may include melting the solder paste 230 through a reflow process, or the like, after the light emitting device packages 100 are disposed on the package mounting substrates 200, to bond the light emitting device packages 100 to the package mounting substrates 200.

Figure 12B:
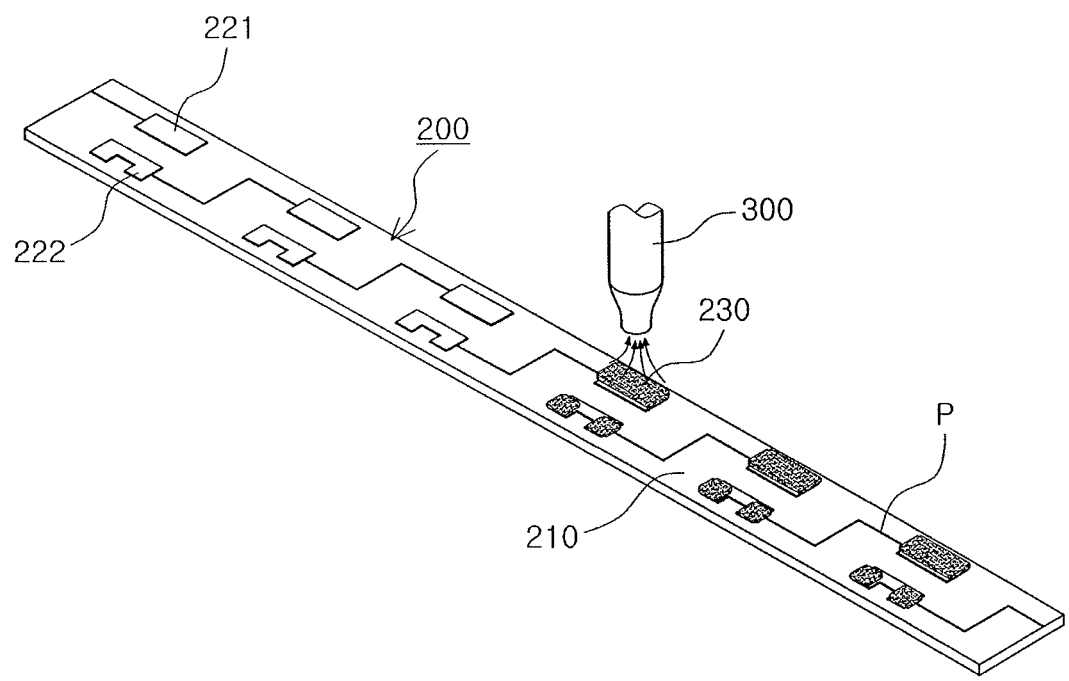

Meanwhile, when it is determined that the information exceeds the pre-set tolerance range, the solder paste 230 coated on the package mounting substrates 200 may be removed as illustrated in FIG. 12B (S25-2). For example, in this process, a solder paste remover 300 may be used.

Thereafter, the solder paste 230 is applied again to the package mounting substrates 200 (S22), from which the solder paste 230 was removed, such that an appropriate amount of solder paste 230 is applied to desired positions.

Utilization Example 2 of Apparatus for Measurement of a 3D Shape

Unlike the utilization example described above, the apparatus for measurement of a 3D shape according to an embodiment may be used in a process of manufacturing a light emitting device package.

Figure 13:
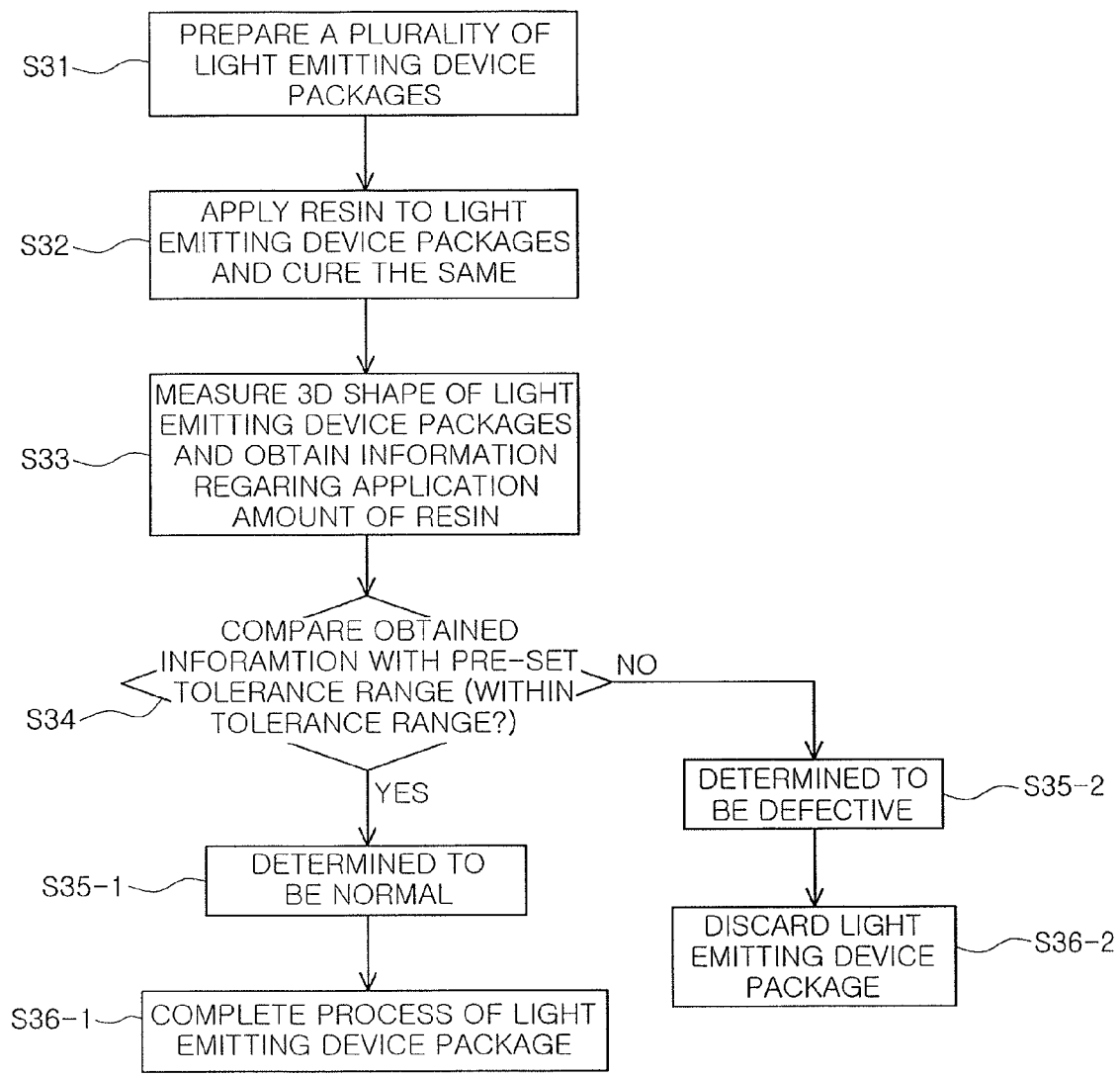
FIG. 13 illustrates a flow chart of manufacturing a light emitting device package by using an apparatus for measurement of a 3D shape according to an embodiment.

FIG. 13 illustrates a flow chart of stages in a process of manufacturing a light emitting device package according to an embodiment.

Referring to FIG. 13, the method for manufacturing a light emitting device package may include an operation (S31) of preparing a plurality of light emitting device packages including a light emitting device disposed therein, respectively, an operation (S32) of applying a resin including wavelength conversion materials to the light emitting device packages and curing the resin (S32), an operation (S33) of measurement of a 3D shape of the light emitting device packages having the cured resin unit, respectively, to obtain information regarding an application amount of the resin, an operation (S34) of comparing the obtained information with a pre-set tolerance range, and an operation (S35-1) of determining that the light emitting packages are normal when the obtained information satisfies the tolerance range and an operation (S35-2) of determining that the light emitting device packages are defective when the obtained information exceeds the tolerance range.

For example, when the light emitting device packages are determined to be normal, the process of manufacturing the light emitting device packages may be completed (S36-1), and when the light emitting device packages are determined to be defective, the light emitting device packages may be discarded (S36-2), but embodiments are not limited thereto.

This will be described in detail with reference to FIGS. 14 through 17.

Figure 14:
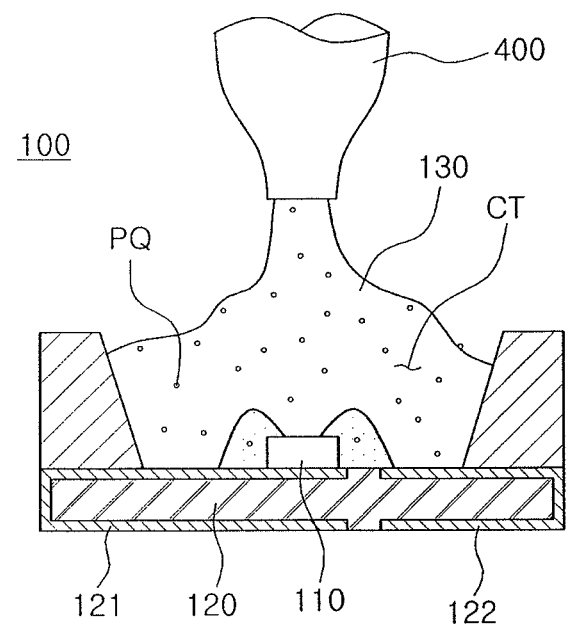
FIGS. 14 through 16 illustrate views specifically illustrating a method for manufacturing a light emitting device package according to the embodiment of FIG. 13.

FIG. 14 illustrates a cross-sectional view of a process of applying the resin unit 130 including wavelength conversion materials PQ to the light emitting device package 100 after the operation (S31) of preparing the light emitting device package 100 including the light emitting device 110 disposed therein is completed.

Referring to FIG. 14, the light emitting device package 100 according to the present embodiment may include the light emitting device 110 and the package body 120 in which the cavity CT accommodating the light emitting device 110 is formed.

Here, the resin unit 130 may be applied to the cavity CT by a dispenser 400. For example, the resin unit 130 may include wavelength conversion materials PQ, and the wavelength conversion materials PQ may be at least one of phosphors and quantum dots.

Figure 15:
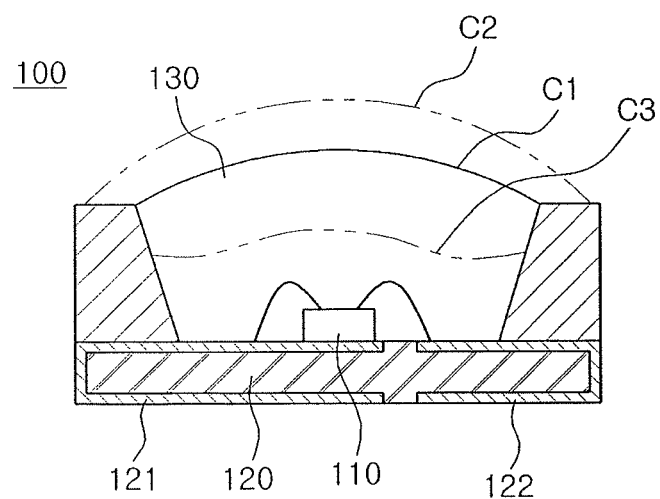

FIG. 15 illustrates a state in which the operation (S32) of curing the resin unit 130 is completed. Here, an appropriate amount of resin unit 130 indicated by C1 may be applied, or alternatively, an excessive or small amount of resin unit 130 may be distributed as indicated by C2 or C3.

Figure 16:
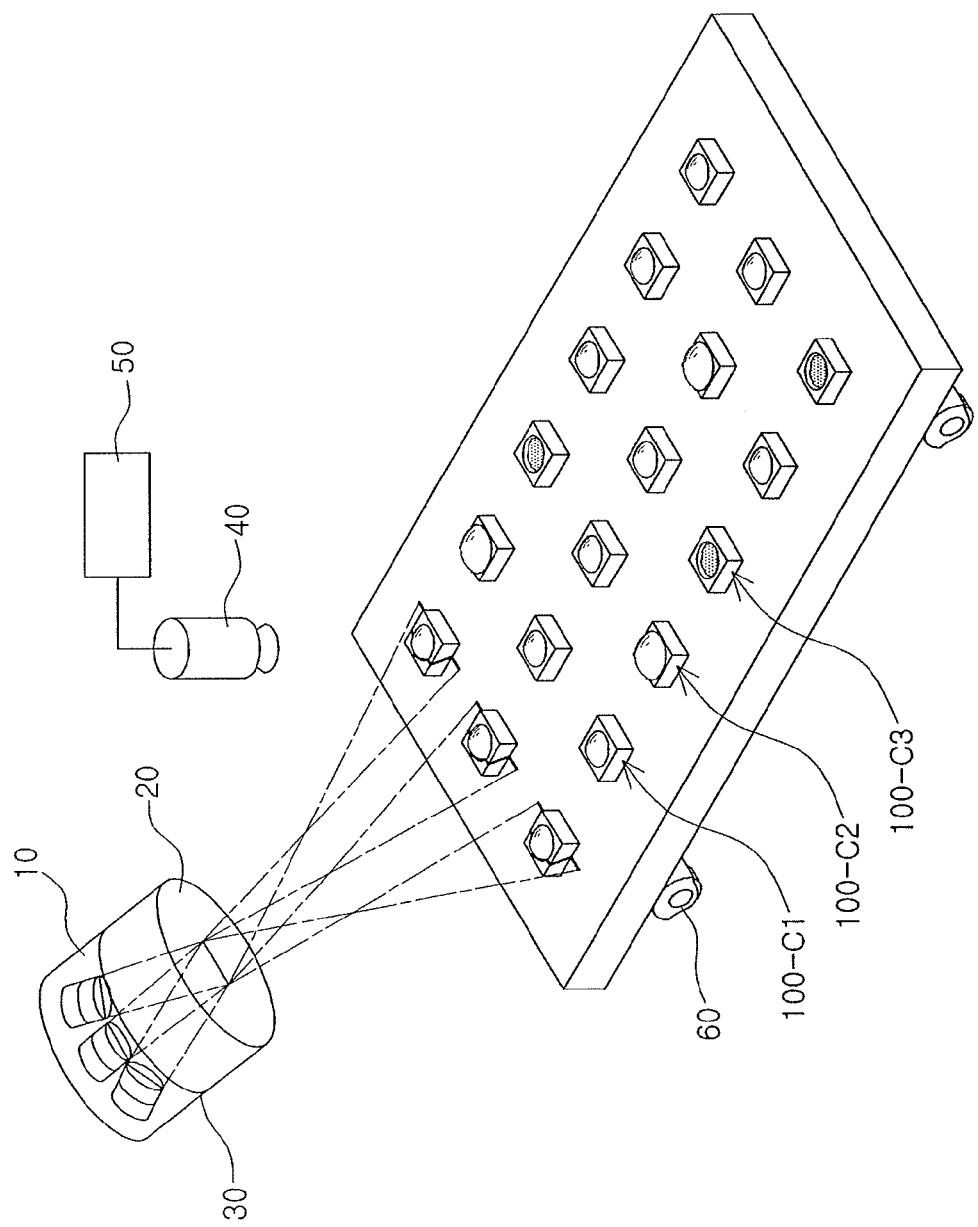

Thereafter, as illustrated in FIG. 16, a 3D shape of the light emitting device package 100 with the cured resin unit 130 is measured to obtain information regarding an application amount of the resin unit 130 (S33).

Figure 17:
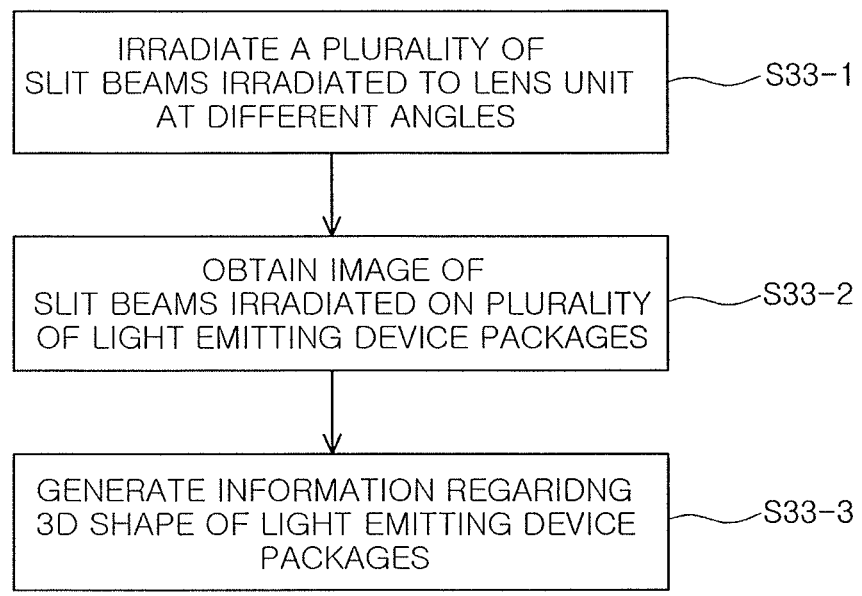
FIG. 17 illustrates a flow chart of obtaining information regarding an application amount of a resin unit in the embodiment of FIG. 13.

In this case, as illustrated in FIG. 17, the operation (S33) may include an operation (S33-1) of irradiating a plurality of slit beams irradiated at different angles to the lens unit 20 such that the slit beams are imaged on the plurality of light emitting device packages 100 through the lens unit 20, an operation (S33-2) of obtaining images of the plurality of measurement objects formed by the slit beams irradiated on the plurality of light emitting device packages 100, and an operation (S33-3) of generating information regarding a 3D shape of the light emitting device packages 100 from the obtained image. In this case, slit beams imaged on the plurality of light emitting device packages 100 may be a plurality of slit beams.

Here, information regarding an application amount of the resin unit 130 coated on the light emitting device packages 100 may be obtained from the information regarding the 3D shape of the light emitting device packages 100.

Thereafter, the obtained information may be compared with a pre-set tolerance range (S34). When the obtained information satisfies the tolerance range, it may be determined that a light emitting device package 100-C1 is normal (S35-1), and when the obtained information exceeds the tolerance range, it may be determined that light emitting device packages 100-C2 and 100-C3 are defective (S35-2).

Thereafter, for example, when the light emitting device packages 100-C2 and 100-C3 are determined to be defective, they may be discarded (S36-2), and when the light emitting device package 100-C1 is determined to be normal, the process of manufacturing the light emitting device package 100-C1 may be completed (S36-1).

As set forth above, according to an embodiment, the apparatus for measurement of a 3D shape includes a plurality of slit beams that are irradiated toward a lens at different angles, thereby enabling measurement of a plurality of measurement targets simultaneously. As such, efficiency and reliability of the measurement operation may be substantially improved. Also, according to another embodiment, the method for effectively manufacturing a light emitting device or a light emitting device package by employing the improved 3D measurement scheme can be obtained.

In contrast, a conventional apparatus for measurement of a three-dimensional (3D) shape using laser trigonometry may detect only a single measurement object through a single scan, thereby requiring a lengthy time for measurement. In another conventional apparatus for measurement of a three-dimensional (3D) shape using laser trigonometry, a plurality of measurement targets may be detected by lengthening a slit beam, thereby increasing the width and length of slit beam, which in turn, reduced measurement precision.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for measurement of a three-dimensional (3D) shape, the apparatus comprising:
a lens unit to transmit the plurality of slit beams toward a plurality of measurement objects;
a light source unit to irradiate the plurality of slit beams toward the lens unit, the slit beams being incident on the lens unit at different angles from each other;
an imaging unit above the measurement objects to obtain images of the plurality of measurement objects formed by the plurality of slit beams transmitted to the plurality of measurement objects; and
a calculation processing unit to generate information regarding a 3D shape of the
plurality of measurement objects from the images obtained by the imaging unit, wherein the light source includes:
a first light source unit irradiating a slit beam to the lens unit at a first irradiation angle relative to a normal to the lens unit; and
a second light source unit irradiating a slit beam to the lens unit at a second irradiation angle relative to a normal to the lens unit, the second irradiation angle being different from the first irradiation angle, and the slit beams from the first and second light source units being irradiated on a same portion of the lens unit.

2. The apparatus as claimed in claim 1, further comprising a third light source unit irradiating a slit beam to the lens unit an angle different from the first and second irradiation angles.

3. The apparatus as claimed in claim 1, further comprising an angle controller to adjust angles at which the plurality of slit beams is irradiated on a same portion of the lens unit.

4. The apparatus as claimed in claim 3, wherein the angle controller sets the angles such that the plurality of slit beams have overlapping regions through the lens unit, the lens unit is transmitting a single slit beam to the plurality of measurement objects.

\* \* \* \* \*